Dec. 15, 1953   E. O. BEER   2,662,465
AUTOMATIC BOILER AND TOASTER
Filed Aug. 1, 1950                                    4 Sheets-Sheet 1
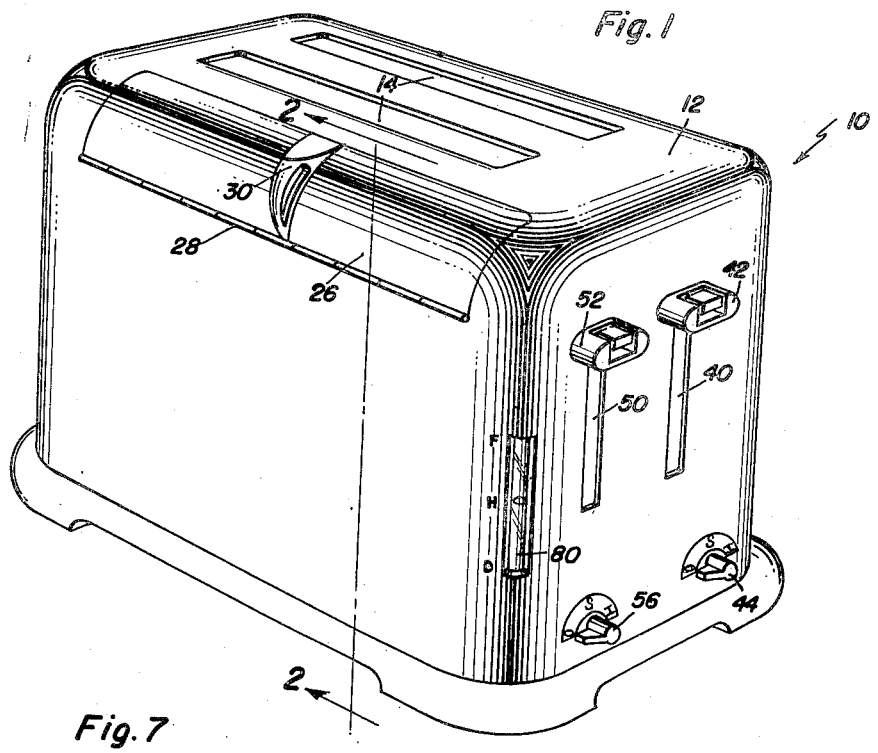
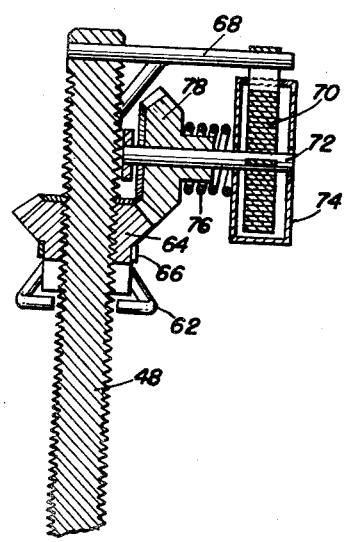
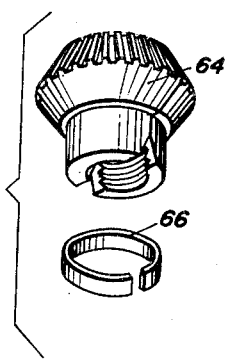
Earl O. Beer
INVENTOR.
BY
Attorneys Dec. 15, 1953 E. O. BEER 2,662,465
AUTOMATIC BOILER AND TOASTER
Filed Aug. 1, 1950 4 Sheets-Sheet 2
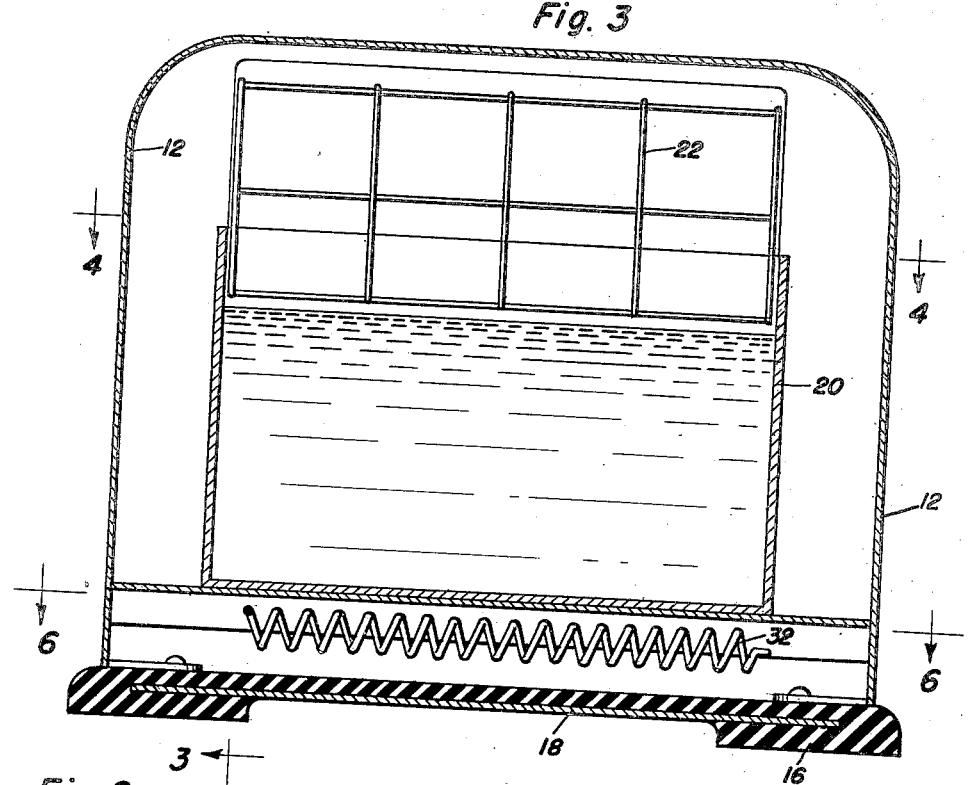
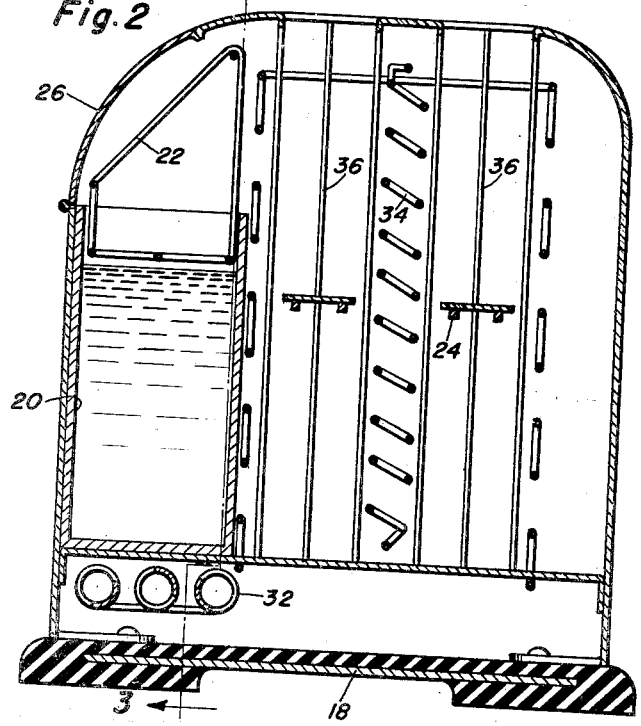
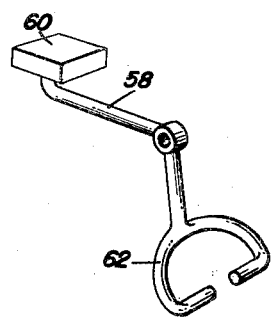
Earl O. Beer
INVENTOR.
BY Dec. 15, 1953

E. O. BEER 2,662,465

AUTOMATIC BOILER AND TOASTER

Filed Aug. 1, 1950

Earl O. Beer
INVENTOR.

BY *Clarence A. O'Brien*
*and Harvey B. Jacobson*
Attorneys

Dec. 15, 1953     E. O. BEER     2,662,465
AUTOMATIC BOILER AND TOASTER
Filed Aug. 1, 1950     4 Sheets-Sheet 4
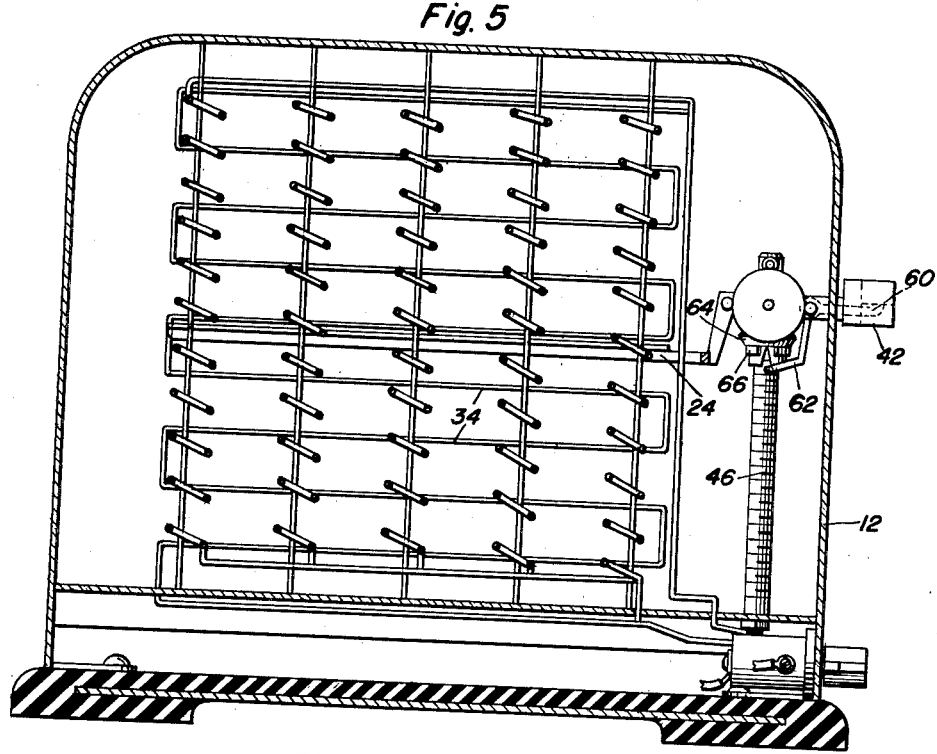
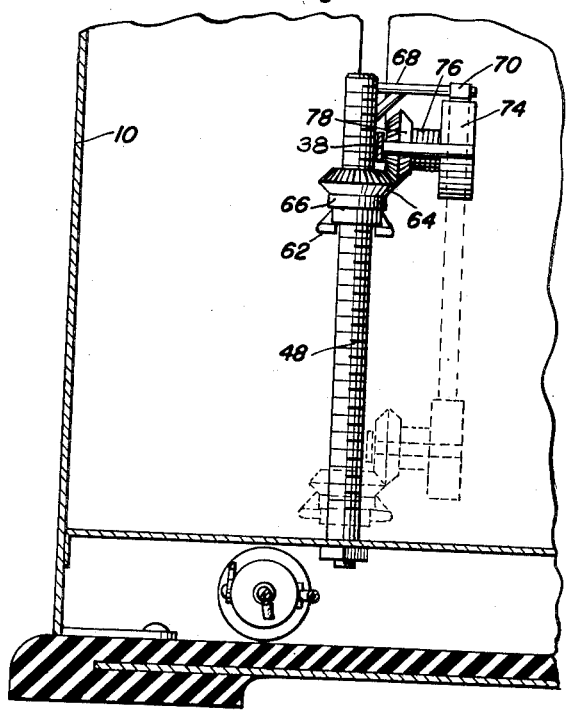
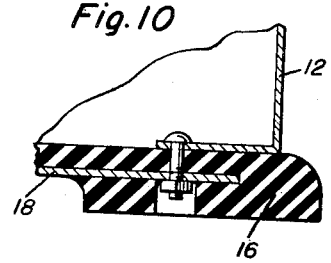
Earl O. Beer
INVENTOR.

Patented Dec. 15, 1953

2,662,465

UNITED STATES PATENT OFFICE 2,662,465

AUTOMATIC BOILER AND TOASTER

Earl O. Beer, Milford, Ind.

Application August 1, 1950, Serial No. 177,064

3 Claims. (Cl. 99—335)

This invention relates to a cooking device and more particularly to an automatic mechanism for toasting bread and boiling eggs.

An object of this invention is to provide a highly ornamental and attractive device having means contained therein for toasting bread and also for boiling eggs or like edible products.

A further object of this invention is to provide a novel timing mechanism for raising and lowering a tray onto which bread is placed when it is desired to toast the same.

Yet another object of this invention resides in the provision of a tank into which a cage may be inserted, the cage being selectively raised from a position in immersion in the fluid in the tank by means of a novel timing mechanism.

A yet further object of this invention is to provide a timing mechanism employing a split bevel gear which is positioned about a threaded post and which also employs means for rotating said bevel gear to raise the bevel gear relative to the post.

Still further objects of this invention reside in the provision of an automatic boiler and toaster that is strong, durable, highly efficient in operation, simple in construction and manufacture, capable of being readily used when emplaced on the dining table in a home, and which device may be used for cooking a variety of foods.

These, together with the various ancillary objects of the invention which will become apparent as the following description proceeds, are attained by this combined boiler and toaster, a preferred embodiment of which has been illustrated in the accompanying drawings, by way of example only, wherein:

Figure 1 is a perspective view of the device comprising the present invention;

Figure 2 is a vertical sectional view as taken along the plane of line 2—2 in Figure 1;

Figure 3 is a vertical sectional view as taken along the plane of line 3—3 in Figure 2;

Figure 5 is a vertical sectional view as taken along the plane of line 5—5 in Figure 4;

Figure 7 is an enlarged vertical sectional detail as taken along the plane of line 7—7 in Figure 4;

Figure 8 is an exploded view showing the construction of the split bevel gear and split spring used in holding the split bevel gear on the threaded post;

Figure 9 is a perspective view showing the construction of the forked lever comprising one element of the present invention;

Figure 10 is a sectional detail showing the construction of the mounting for the casing; and Figure 11 is a vertical sectional detail showing the construction of the timing mechanism with great clarity.

Figure 4:
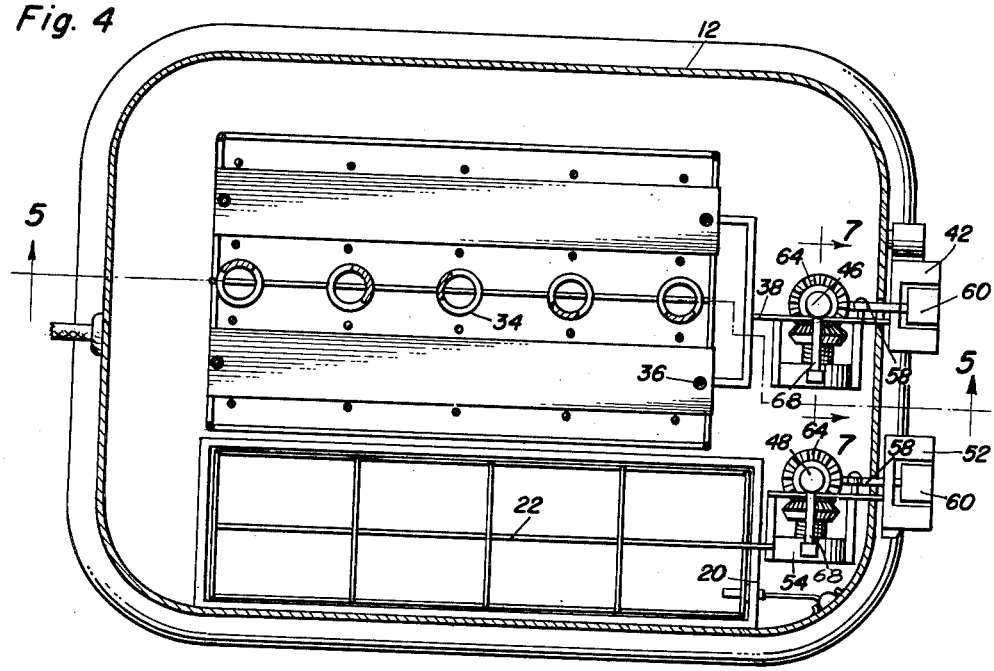
Figure 4 is a horizontal sectional view as taken along the plane of line 4—4 in Figure 3.
Figure 6:
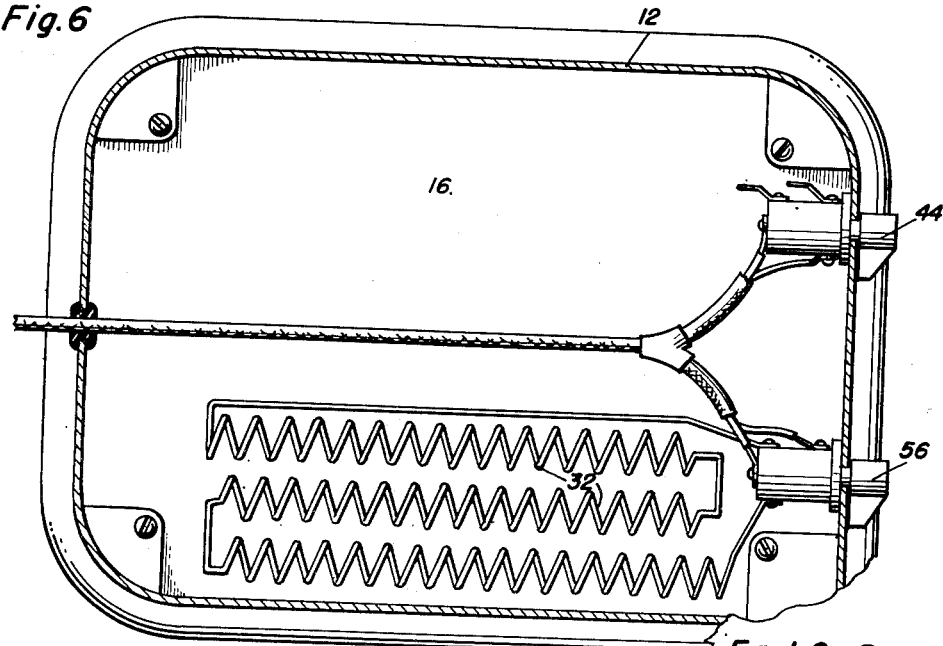
Figure 6 is a horizontal sectional view as taken along the plane of line 6—6 in Figure 3.

With continuing reference to the accompanying drawings wherein like reference numerals designate similar parts throughout the various views, reference numeral 10 generally designates the automatic boiler and toaster comprising the present invention. This device includes a casing 12 having slots 14 in the top thereof for reception of bread in order that such may be toasted. The casing 12 is supported on an insulative base 16 and a steel plate 18 is provided for rigidifying the base.

The casing 12 is divided into two compartments which compartments are formed by the walls of the tank 20. A cage 22 is provided for immersion into the tank 20 so that an egg or like food product placed in the cage may be lowered into the tank 20 so as to be cooked. A tray 24 is provided for supporting the bread placed in through the slots 16. For access to the cage 22 there is provided a lid 26 which is hinged as at 28 to the casing and which may be actuated by means of the handle 30.

Heating coils 32 are provided for heating the water which may be placed in the tank 20. Likewise heating coils 34 are provided for heating and toasting the bread that may be inserted onto the tray 24 within the confines of the slots 14. The tray 24 rides on guides 36 and is connected to a support member 38 which member extends through a slot 40 in the side wall of the casing and terminates in a knob 42. Below the slot 40 there is a thermostatic control member 44 for determining the flow of current into the coils 34.

Upwardly extending from the bottom wall of the casing 12 are threaded posts 46 and 48 which are positioned in alignment with the slot 40 and a slot 50 adjacent the slot 40. Extending through the slot 50 is a knob member 52 similar to the member 42 which is connected to a support member 54. Positioned below the slot 50 is a thermostatic control device 56 similar to the member 44.

Pivotally attached to the support members 38 and 54 are forked levers 58 which extend through the slots 40 and 50 and terminate in button ends 60. The other ends of the levers 58 are bifurcated as at 62 for engagement with split beveled gears 64 which are held in embracing relationship about the posts 48 by means of the split spring collars 66. Depressing the button 60 oscillates the lever 58 and forces the ends 62 into the notch of the split lever gear 64 and spreads gear 64 in opposition to the pressure exerted by the spring 66 so that the threaded bore of the gear 64 is released from the threaded rod 48 and may freely slide therealong. Secured to the upper portions of the posts 48 are rods 68 to which one end of a spring 70 is attached. The other end of the spring 70 is secured to the shafts 72 which are journaled in the support members 38 and 54. A housing 74 is provided for each of the springs 70 and are secured to the shafts 72. A spring 76 biases each housing 74 and a bevel gear 78 mounted on each of the shafts 72 by a key. The bevel gear 78 engages the split bevel gear 64 and the spring 76 allows the gears 78 to slide on shaft 72 when the button 60 is depressed and the bifurcated ends 62 open the split bevel gear 64 allowing the support members 38 or 54 to be depressed, the ends 62 lock the gear 64 against rotation and as gear 78 is engaged with gear 64, gear 78 is likewise locked against rotation, the depression of the supports thus winding the springs 70. When released, the springs 70 cause the rotation of the shafts 72 and hence the bevel gears 78 thus rotating the split bevel gears 64 and causing such to rise thus urging upwardly the support members associated therewith. Suitable switch mechanisms may be associated with the push button 60 heads 60 and the members 42 and 52 so as to close a circuit to the heating coils or else such may be individually controlled by the thermostatic members 44 and 56 as desired, the electrical connections being well within the skill and choice of those having a knowledge of the art.

If desired a liquid level gauge 80 for the tank may be provided.

Since from the foregoing the construction and advantages of this automatic boiler and toaster are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. In a toaster having a casing including a bread toasting compartment, a tray in said toasting compartment, a slot in said casing, and supporting members extending through said slot and attached to said tray, a timing mechanism controlling the raising of said tray after the tray has been lowered in the compartment, said timing mechanism comprising a threaded post, a split bevel gear threadedly engaged on said post, a forked lever engaging said split bevel gear, a split spring about said split bevel gear, said forked lever being pivotally attached to said support member, a shaft journaled in said member, a rod carried by said post, a second bevel gear on said shaft engaging said split bevel gear, and spring means terminally secured to said shaft and said rod for rotating said rod and second bevel gear to rotate said split bevel gear.

2. In a cooking device having a processing compartment, a food supporting tray in said compartment, a casing enclosing said compartment, said casing having a vertically arranged slot therein, supporting means fixed to said tray and extending through said slot, a timing mechanism for moving said food supporting tray comprising a threaded rod, a split bevel gear threadedly engaging said rod, a bifurcated lever journaled on said support means, a bevel gear journaled on said support means and biased into driving contact with said split bevel gear, resilient means urging said split bevel gear into contact with said rod, spring driving means for the bevel gear journaled on said supporting means, means for pressing said bifurcated lever into contact with said split gear to disengage said split gear from said rod, means for traversing said split gear along said rod for lowering the supporting means and winding said spring driving means.

3. A timing mechanism for use in a food processing device having a casing, a food tray in said casing, said casing having a vertically disposed slot, a support member fixed to said tray and extending through said slot, a threaded post mounted in said casing in proximity to said slot, a split bevel gear threadedly engaging said threaded post when closed, a split spring embracing said split bevel gear and urging said gear to closed position, a lever pivotally mounted on said support member, one end of said lever projecting through said slot, a bifurcated end on said lever, said bifurcated end being engaged in the split of said split bevel gear, said lever being operable to open said split bevel gear, a shaft journaled on said support member, a second bevel gear fixed on said shaft and meshing with said split bevel gear, a driving spring wound on said shaft, said driving spring being anchored adjacent the top of said threaded post.

EARL O. BEER.

References Cited in the file of this patent

UNITED STATES PATENTS

| Number | Name | Date |
|---|---|---|
| 1,336,565 | Ketler | Apr. 13, 1920 |
| 1,478,939 | Cavilla | Dec. 25, 1923 |
| 1,923,590 | Schlemm | Aug. 22, 1933 |
| 1,946,886 | Schramm | Feb. 13, 1934 |
| 2,345,769 | Osrow | Apr. 4, 1944 |
| 2,372,978 | Pelenberg | Apr. 3, 1945 |
| 2,470,548 | Desjardins | May 17, 1949 |